United States Patent [19]

Nonomiya et al.

[11] 3,717,477
[45] Feb. 20, 1973

[54] SWEETENING AGENT CONTAINING TRYPTOPHANE AND SACCHARIN

[75] Inventors: Tsunehiko Nonomiya, Totsaka-ku, Yokohama-shi, Kanagawa-ken; Takashi Ojima, Kawasaki-shi, Kanagawa-ken; Shizuko Yamaguchi, Taito-ku, Tokyo; Mieko Ito, Kamakura-shi, Kanagawa-ken, all of Japan

[73] Assignee: Ajinomoto Co., Inc., Tokyo, Japan

[22] Filed: Jan. 4, 1971

[21] Appl. No.: 103,828

[30] Foreign Application Priority Data

Jan. 16, 1970   Japan ................................ 45/4286

[52] U.S. Cl. ............................................ 99/141 A
[51] Int. Cl. ............................................ A231 1/26
[58] Field of Search ......... 99/141, 141 A, 28, 78, 140

[56] References Cited

UNITED STATES PATENTS 3,535,336   10/1970   Kornfeld ........................ 260/326.14

OTHER PUBLICATIONS

Greenstern et al., Chemistry of the Amino Acids, Volume 1 page 151 (1961).
Battle, Synethtic Sweetening Agents, Manufacturing Chemist 1964, pages 60–65.

*Primary Examiner*—Raymond N. Jones
*Assistant Examiner*—Roger B. Andewelt
*Attorney*—Kelman and Berman

[57]   ABSTRACT

The sweetening potency and taste of saccharin sodium are improved by the addition of even small amounts of D-tryptophan in the form of the optically active compound or as a component of DL-tryptophan.

2 Claims, No Drawings

SWEETENING AGENT CONTAINING TRYPTOPHANE AND SACCHARIN

The present invention relates to sweetening and particularly to an improvement in the sweetening potency and taste of saccharin of sodium.

Artificial sweeteners are widely used in food to obtain a taste different from sucrose, to prevent overweight and diabetes, to prevent browning of foodstuffs, and to prevent fermentation by microorganisms.

As dulcin and cyclamate were recently prohibited in many countries because of their toxic properties, sodium saccharin is now mainly employed as an artificial sweetening. However, with sodium saccharin the potency of sweetness does not increase corresponding to an increase of its concentration and the unpleasant after-taste characteristic thereof becomes strong with increasing concentration.

According to this invention sodium saccharin is mixed with D- or DL-tryptophan, whereby the intensity of sweetness is remarkably strengthened because of a unique synergistic effect, and at the same time the quality of taste shows a very significant improvement with the elimination of the unpleasant after-taste.

Experimental results on the synergistic effect and quality improvement mentioned above are shown hereunder. The panel used in the experiments consisted of 100 persons, both male and female, who were screened from approximately 1,000 people based on the sensitivity of their taste.

TABLE 1

The potency of sweetness of saccharin and tryptophan

| Sweet substance | Equivalent concentration of the present sweetners and sucrose (g/dl) | | | | |
|---|---|---|---|---|---|
| Sodium Saccharin | 0.005 | 0.01 | 0.02 | 0.04 | 0.08 |
| Sucrose | 2.2 | 3.5 | 5.5 | 7.4 | 9.2 |
| D-tryptophan | 0.05 | 0.1 | 0.2 | — | — |
| Sucrose | 3.0 | 5.1 | 8.5 | — | — |
| DL-tryptophan | 0.05 | 0.1 | 0.2 | — | — |
| Sucrose | 1.5 | 2.8 | 4.9 | — | — |

In a comparison with sucrose the sweetening potency of both saccharin and tryptophan falls as their concentration increases. On the other hand, the bitterness increases to when the concentration of become higher.

The potency of DL-tryptophan is about one-half of D-tryptophan.

Experiment 2

Test solutions containing different concentrations of sodium saccharin, DL-tryptophan or D-tryptophan as shown in Table 2 were prepared, and the degree of bitterness or unfavorable taste of each test solution was checked by an organoleptic test of 15 panel members.

The organoleptic test was performed by requesting to point out the degree of bitterness shown hereunder (ranking method).

| | marks |
|---|---|
| A: no bitter taste | 0 |
| B: slightly bitter taste | 1 |
| C: bitter taste | 2 |
| D: strongly bitter taste | 3 |

TABLE 2.—POTENCY OF BITTERNESS OR UNFAVOURABLE TASTE OF SODIUM SACCHARIN AND D- OR DL-TRYPTOPHAN

| | Sample | | | | | | | | |
|---|---|---|---|---|---|---|---|---|---|
| | Sodium saccharin | | | | DL-tryptophan | | | D-tryptophan | |
| Concentration (g./dl.) | 0.01 | 0.02 | 0.04 | 0.08 | 0.05 | 0.1 | 0.2 | 0.05 | 0.1 |
| Judgement: | | | | | | | | | |
| A | 8 | 6 | 1 | 1 | 9 | 6 | 2 | 10 | 7 |
| B | 5 | 8 | 7 | 3 | 3 | 4 | 3 | 4 | 4 |
| C | 2 | 1 | 5 | 5 | 2 | 3 | 4 | 0 | 2 |
| D | 0 | 0 | 2 | 6 | 1 | 2 | 6 | 1 | 2 |
| Average mark | 0.60 | 0.67 | 1.53 | 2.07 | 0.67 | 1.07 | 1.93 | 0.47 | 0.93 |

Experiment 1.

The potency of an aqueous solution of each individual sweetener was measured in comparison with sucrose, by repeatedly obtaining the points of subjective equality between the sweetners and sucrose with the participation of 25–50 panel members. In the experiment, a sweetener solution was paired with several concentrations (5–7 grades) of sucrose solution and pairs of samples were presented at random. Then, the panelists were asked to indicate which one in each pair had a stronger sweetness. The data obtained were analyzed by the probit method and the sweetness of the test sample was represented by the concentration of sucrose required to attain the sweetness equivalent to the test sample. Only the final data are shown in Table 1.

Experiment 3

In the absence of a synergistic effect in a mixture of sodium saccharin and D- or DL-tryptophan, the potency of the mixture should be smaller than the sum of the potencies of the components in sucrose equivalent, because with both saccharin and tryptophan the potency of sweetness does not increase corresponding to an increase of its concentration.

25 panel members compared the intensity of sweetness of each mixture and of sucrose solutions, whose concentrations were equal to or higher than the sum of component potencies (in sucrose equivalent). The results obtained are listed in Table 3.

TABLE 3

| Sample to be compared (g./dl.) | T (sucrose) | No. of persons who judged S>T | No. of persons who judged S<T | (*) |
|---|---|---|---|---|
| Sodium saccharin 0.01 plus D-tryptophan 0.05 (in sucrose equivalent 3.5+3.0=6.5) | 6.5 | 25 | 0 | +++ |
| | 7 | 25 | 0 | +++ |
| | 8 | 24 | 1 | +++ |
| | 9 | 19 | 6 | ++ |
| Sodium saccharin 0.02 plus DL-tryptophan 0.05 (in sucrose equivalent 5.5+1.5=7.0) | 7 | 25 | 0 | +++ |
| | 8 | 20 | 5 | ++ |
| | 9 | 18 | 7 | + |

TABLE 3 — Continued

| | Sample to be compared (g./dl.) | | Result of judgment | | |
|---|---|---|---|---|---|
| S | | T (sucrose) | No. of persons who judged S>T | No. of persons who judged S<T | (*) |
| Sodium saccharin 0.02 plus DL-tryptophan 0.1 (in sucrose equivalent 5.5+2.8=8.3) | | 8.3 | 25 | 0 | +++ |
| | | 9 | 23 | 2 | +++ |
| | | 10 | 18 | 7 | + |
| Sodium saccharin 0.01 plus sucrose 5 (in sucrose equivalent 3.5+5=8.5) | | 8.5 | 12 | 13 | — |

*—: Not significant; +: Significant at $p \leq 0.05$; ++: Significant at $p \leq 0.01$; +++: Significant at $p \leq 0.001$.

NOTE.—The potency of sweetness of sodium saccharin and D- or DL-tryptophan was calculated in terms of sucrose based on the results shown in Table 1.

As is apparent from Table 3, no effect was observed in the combination of sodium saccharin and sucrose, while a synergistic effect was observed for sodium saccharin and D- or DL-tryptophan.

Experiment 4

15 Panel members evaluated the bitterness or unfavorable taste of solutions containing sodium saccharin and tryptophan by the method of Experiment 2. The concentration of each sample and experimental results are shown in Table 4.

It is clear that the quality of taste can be improved when sodium saccharin and D- or DL-tryptophan are used in combination, especially when the concentration of sodium saccharin is more than 0.04 g/dl.

TABLE 4

| | Sodium saccharin (g./dl.) | | | | | | |
|---|---|---|---|---|---|---|---|
| | 0.02 | 0.04 | 0.08 | 0.02 | 0.04 | 0.08 | 0.08 |
| Try. (g./dl.) | DL-try. 0.05 | | | DL-try. 0.1 | | | D-try. 0.05 |
| Judgment: | | | | | | | |
| A | 9 | 6 | 4 | 8 | 7 | 4 | 5 |
| B | 4 | 7 | 7 | 5 | 6 | 6 | 7 |
| C | 2 | 2 | 2 | 2 | 1 | 3 | 2 |
| D | 0 | 0 | 2 | 0 | 1 | 2 | 1 |
| Average mark | 0.53 | 0.73 | 1.13 | 0.60 | 0.73 | 1.20 | 0.93 |

Experiment 5

To each of 25 panel members, three test samples were presented simultaneously. Two containing a single substance, saccharin or tryptophan (C in Table 5), the third containing both saccharin and tryptophan (S in Table 5). Each of the panelists was requested to point out the sample which he believed to be different from the others. By this test, the minimum amount of D- or DL-tryptophan which is effective to improve the taste of a solution of saccharin and also the minimum amount of sodium saccharin which is effective to improve the taste of a solution of D- or DL-tryptophan were determined.

As seen from Table 5, the effect obtained by mixing sodium saccharin and D- or DL-tryptophan was recognized over a wide range of compositions, 0.05–100 parts of tryptophan (in D- tryptophan equivalent) can be used per part of sodium saccharin.

TABLE 5

| Control (C) (g./dl.) | Sample (S) (g./dl.) | No. of persons who answered correctly | | A preference was checked about a correct solver | |
|---|---|---|---|---|---|
| | | | | No. of persons who want S than C | |
| Sodium saccharin 0.02 | C plus DL-Try. 0.005 | 17 | +++ | 55 | ++ |
| | C plus DL-Try. 0.0025 | 14 | + | 12 | + |
| | C plus DL-Try. 0.00125 | 8 | — | | |
| | C plus D-Try. 0.00125 | 15 | ++ | 13 | ++ |
| Sodium saccharin 0.05 | C plus DL-Try. 0.005 | 15 | ++ | 12 | + |
| | C plus DL-Try. 0.0025 | 7 | — | | |
| | C plus D-Try. 0.0075 | 17 | +++ | 13 | + |
| DL-Try. 0.1 | C plus saccharin 0.0005 | 17 | +++ | 13 | + |
| | C plus saccharin 0.00025 | 6 | — | | |
| DL-Try. 0.2 | C plus saccharin 0.001 | 14 | + | 12 | + |
| | C plus saccharin 0.0005 | 8 | — | | |
| D-Try. 0.1 | C plus saccharin 0.0025 | 14 | + | 13 | ++ |

What we claim is:

1. A sweetening composition containing, as sweetening agents, sodium saccharin and D-tryptophan in a weight ratio between 20:1 and 1:100, said D-tryptophan being present in said composition as optically active D-tryptophan or as a component of DL-tryptophan.

2. A method of sweetening edible material which comprises adding to said material saccharin sodium and D-tryptophan in an amount sufficient to produce the desired degree of sweetness, the weight ratio of said saccharin sodium to said tryptophan being between 20:1 and 1:100, said D-tryptophan being optically active D-tryptophan or a component of DL-tryptophan.

* * * * *